US008655044B2

(12) United States Patent
Bhattacharjee et al.

(10) Patent No.: US 8,655,044 B2
(45) Date of Patent: Feb. 18, 2014

(54) METHOD AND APPARATUS FOR DETERMINING AUTHENTICITY

(75) Inventors: Sushil Bhattacharjee, Renens (CH); Alexandre Gret, Spiegel bei Bern (CH); Hansjorg Klock, Rufenacht (CH); Edward John Brindley, Frimley (GB)

(73) Assignee: De La Rue International Limited, Hampshire (GB)

( * ) Notice: Subject to any disclaimer, the term of this patent is extended or adjusted under 35 U.S.C. 154(b) by 483 days.

(21) Appl. No.: 12/990,579

(22) PCT Filed: May 2, 2008

(86) PCT No.: PCT/GB2008/001535
§ 371 (c)(1),
(2), (4) Date: Mar. 23, 2011

(87) PCT Pub. No.: WO2009/133332
PCT Pub. Date: Nov. 5, 2009

(65) Prior Publication Data
US 2011/0187501 A1 Aug. 4, 2011

(51) Int. Cl.
*G06K 9/00* (2006.01)
*G06K 5/00* (2006.01)

(52) U.S. Cl.
USPC ............................ 382/135; 382/286; 235/380

(58) Field of Classification Search
USPC ......... 382/100, 103, 112–116, 135–140, 155, 382/162, 168, 173, 181, 193, 199, 209, 219, 382/232, 254, 274, 276, 282, 294, 305, 312, 382/321, 286; 235/380; 356/380
See application file for complete search history.

(56) References Cited

U.S. PATENT DOCUMENTS

| | | | | |
|---|---|---|---|---|
| 4,464,786 | A * | 8/1984 | Nishito et al. | 382/135 |
| 4,837,840 | A * | 6/1989 | Goldman | 382/135 |
| 5,325,167 | A * | 6/1994 | Melen | 356/71 |
| 7,815,109 | B2 * | 10/2010 | Silverbrook et al. | 235/380 |
| 8,194,919 | B2 * | 6/2012 | Rodriguez et al. | 382/100 |

FOREIGN PATENT DOCUMENTS

| | | | |
|---|---|---|---|
| CN | 2472281 | Y | 1/2002 |
| DE | 10 2007 015 484 | A1 | 10/2008 |
| EP | 1 555 139 | A1 | 7/2005 |
| GB | 2 458 485 | A | 9/2009 |
| WO | WO 03/046282 | A1 | 6/2003 |
| WO | WO 2008/128755 | A1 | 10/2008 |

OTHER PUBLICATIONS

International Search Report dated Mar. 25, 2009 in corresponding International Application No. PCT/GB2008/001535.

Written Opinion of the International Searching Authority dated Mar. 25, 2009 in corresponding International Application No. PCT/GB2008/001535.

* cited by examiner

*Primary Examiner* — Seyed Azarian
(74) *Attorney, Agent, or Firm* — Oliff PLC

(57) ABSTRACT

A method of determining the authenticity of a document of value provided with a watermark pattern, the method comprising determining whether the watermark pattern exhibits a discontinuity.

18 Claims, 8 Drawing Sheets

METHOD AND APPARATUS FOR DETERMINING AUTHENTICITY

The invention relates to a method and apparatus for determining the authenticity of a document of value such as a banknote, fiscal cheque, travelers cheque, fiscal stamp, postal stamp, certificate of authenticity, brand protection article, bond, certificate or voucher.

Recently, counterfeiters have started to produce so-called composite banknotes. In such composite banknotes, part of a genuine banknote is cut out and replaced by a paper strip or the like enabling the cut out part to be used to produce a further, counterfeit banknote or bill. There is a need, therefore, to detect such composite banknotes and this has been difficult using conventional optical inspection techniques. The difficulty stems from the similarity between the genuine substrate and that used to produce the substitute strips. Although such counterfeits are usually held together with tape and this can be detected, it is difficult to differentiate between tape that is used for counterfeiting and tape that is used to mend a torn note.

In accordance with a first aspect of the present invention, a method of determining the authenticity of a document of value provided with a watermark pattern comprises determining whether the watermark pattern exhibits a discontinuity.

In accordance with a second aspect of the present invention, apparatus for determining the authenticity of a document of value provided with a watermark pattern comprises a device for detecting a watermark pattern formed in a substrate of the document; and a processor for determining whether the watermark pattern exhibits a discontinuity.

We have realized that it is possible to make use of watermark patterns already included in genuine banknotes and other documents of value to detect composite banknotes. This has the significant advantage that no additional information needs to be incorporated into the banknote.

In principle, if, in constructing a composite banknote, the counterfeiter has to remove part of a watermark pattern in the substrate then this will be detectable as a result of a discontinuity.

For the purpose of this invention watermarks are defined as a variation in the mass of paper fibres, in grammes per square meter (gsm), to form a predefined pattern in the finished paper. Watermarks used for the purpose of detecting composite counterfeits may be produced by any of the known watermarking methods. One such method, known as shadow watermarks are produced by forming a mat of paper making fibres on an embossed permeable surface. Another known method is to use electrotype watermarks. These are produced by attaching impermeable shapes to the permeable surface upon which the fibres are formed. These watermarking methods are typically used to produce watermarks that are visible to members of the public and can be used to authenticate a security document.

For the purpose of this invention it is possible to produce watermarks that represent mass variations on a scale too small for the public to see without the use of a magnifier. Such watermarks may be made using the embossing or electrotype methods described above. It is also possible to make such watermarks by using a permeable surface upon which to form the fibre mat that has variations in topography which result in small scale variations in paper gsm. Such variations could cover the entire document or be limited to specific regions such as the edges of the document. For the purpose of this invention such watermarks provide the advantage of being largely invisible to the public but detectable by a machine and can therefore be retrospectively added to a security document design without the need for a public education programme.

The watermark pattern can be detected in any conventional manner, including paper thickness detection, but more typically by exposing at least part of the watermark pattern to radiation, such as x-ray or infrared radiation, and obtaining a corresponding image based on radiation transmitted through, or reflected by, the document of value.

The radiation used is preferably x-ray or infrared radiation although other wavelength bands may be suitable providing they are not influenced unduly by the presence of print on the document.

In the method described above, the discontinuity in the watermark pattern was determined by comparing the watermark pattern under test with a genuine watermark pattern.

In another method, the determining step comprises comparing the degree of registration between print on the document of value on the one hand and the watermark pattern on the other hand at different locations on the document.

In this approach, the document of value under test can be self-evaluated without the need for comparison with a genuine document. This is because there are natural variations in registration between print on a document and the watermark pattern which will vary from document to document. However, within a single, genuine document, the registration between print and watermark pattern should be substantially the same at all locations on the document.

Typically, the determining step is carried out at least three locations on the document of value. This ensures there is a reasonable chance to detect a composite document but within a practical time period.

The relative registration between print and watermark pattern can be determined in a variety of ways. For example, particular print features could be detected and compared with particular parts of the watermark pattern. A particularly convenient approach, however, is to determine a print datum and a watermark pattern datum, the method further comprising determining the distance between the two.

The print on the document of value is typically detected by obtaining an optical image, which will generally be a reflective image, of the surface of the document carrying the print, although a transmissive image could also be used. In some cases, it may be possible to obtain a single image of both the watermark pattern and print, for example using infrared radiation.

The chance of locating a composite document of value will be enhanced the greater the watermark pattern extends over the document. Preferably, therefore, the watermark pattern extends over a major part of the document in one or two dimensions. In general, in the case of a two-dimensional watermark pattern, this preferably extends over at least 50%, preferably at least 75%, and most preferably at least 90% of the area of the document.

The watermark pattern can take a variety of forms both one and two dimensional. It typically includes at least one straight or undulating line extending adjacent an edge of the document and preferably such lines extending along all edges of the document.

The watermark pattern could also comprise a regular two-dimensional grid, for example formed by straight or undulating lines extending either parallel or diagonally with respect to sides of the document. However, irregular patterns could also be used or indeed a watermark picture extending across the whole document.

We have realized that some recently developed watermark patterns which are designed to strengthen the document can also be used in the present method of counterfeit detection.

For example, WO-A-03/046282 describes the incorporation of watermarks in corners of a document of value in order to strengthen those corners. In other applications such as described in GB Patent Application No. 0805123.7 filed on 19 Mar. 2008 linear or undulating watermarks are provided along one or more edges of the document.

A particularly preferred document has linear or undulating watermarks extending along all sides of the document. This then means that any attempt to cut out a full strip from the document will inevitably cut across one or more of the watermarks.

In further preferred method, the watermark pattern extends in a two-dimensional manner across the document, for example as lines or a regular two-dimensional grid.

Some examples of methods and apparatus according to the invention will now be described with reference to the accompanying drawings, in which:—

Figure 1:
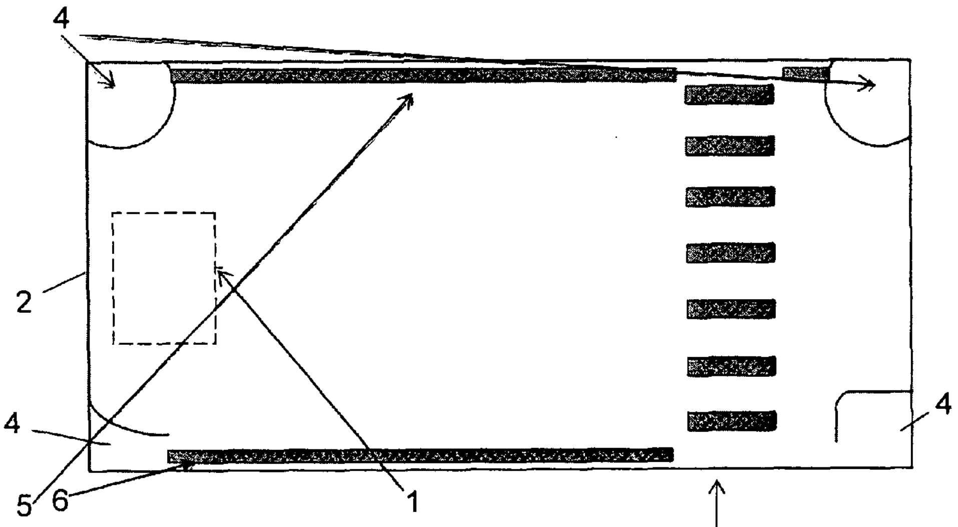
FIG. 1 illustrates schematically a genuine banknote substrate provided with a watermark pattern.

FIG. 1 illustrates the substrate of a genuine banknote (all printing being omitted) and in particular the watermark pattern associated with this particular substrate. Thus, the watermark pattern includes a conventional watermark 1, such as a portrait, located adjacent a short edge 2 of the banknote and an embossed thread 3 extending across a short dimension of the banknote. In addition, watermark areas are provided at the corners 4 of the banknote and forming two lines 5,6 adjacent the long edges of the banknote.

The function of the watermark portions 4,5,6 is to strengthen the substrate as described in more detail in WO-A-03/046282.

In this context, the term "watermark" refers to a watermark created by well known techniques of varying the grammage of paper fibres so that in some areas the fibres are of higher grammage than that of the base paper layer, and in others they are of lower grammage. When viewed in transmitted light the areas of lower grammage are lighter and the areas of higher grammage are darker than the base paper, and the contrast between the light and dark areas can be very clearly seen.

Figure 2:
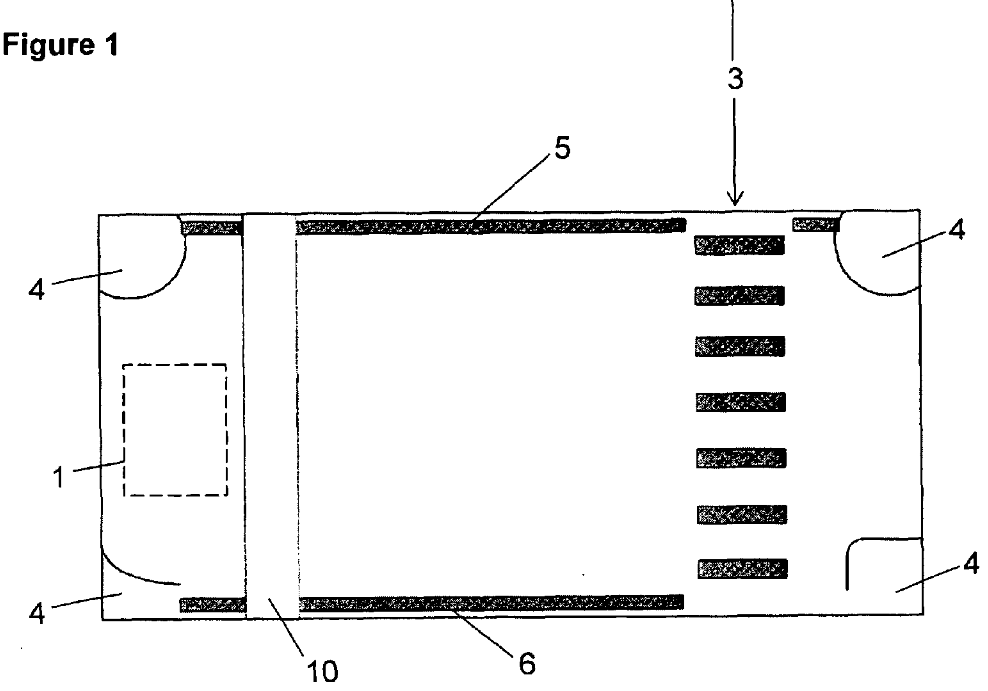
FIG. 2 illustrates a composite banknote substrate.

FIG. 2 illustrates the banknote substrate of FIG. 1 after modification to incorporate a strip 10 of non-genuine material, more or less parallel to the short edge and covering the entire width of the substrate.

It will be noted in FIG. 2 that the strip 10 cuts through the watermark lines 5,6 and this can be detected by suitably detecting those watermark lines.

Figure 3:
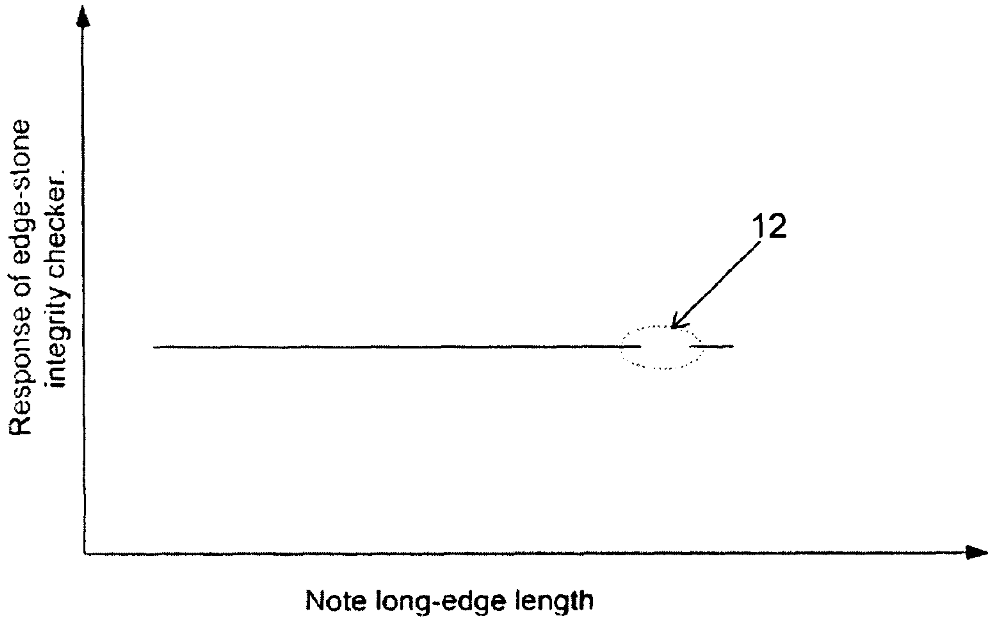
FIG. 3 illustrates graphically the result of inspecting part of the watermark pattern shown in FIG. 1.
Figure 4:
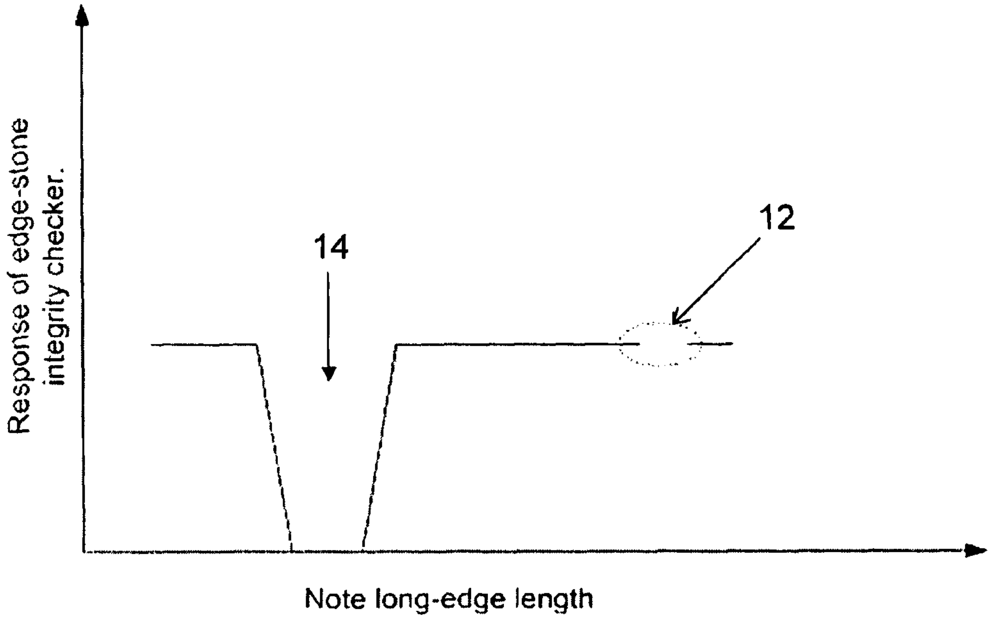
FIG. 4 illustrates graphically the result of inspecting part of the watermark pattern shown in FIG. 2.

FIG. 3 illustrates the response of a watermark detector when inspecting the line 5 of the genuine substrate shown in FIG. 1. As can be seen, this results in a substantially constant output signal except in an exclusion region 12 corresponding to the woven thread 3. However, in the case of the composite note shown in FIG. 2, the output signal drops significantly as shown at 14 in FIG. 4 at a position where the non-genuine strip 10 of material has been inserted.

By comparing the response of the composite note (FIG. 4) with that of a genuine note (FIG. 3) it is possible to detect the composite nature in view of the difference between the responses at 14.

In general, for each denomination of banknote, an aspect of the watermark will be identified which will most likely indicate a composite note. A typical example is a line extending substantially fully along the length of the document. An image of this line together with its immediate neighbourhood (a few pixels on each side) is then stored as a template or master. This is then compared with equivalent image data obtained from the banknote under test and if, over a significant range of contiguous positions, the strength of the match falls below a certain threshold, the system can conclude that the watermark line has been breached.

Integrity-checking of the substrate can be further strengthened by additional substrate features. Some examples of potential substrate-features are shown in FIGS. 5 to 8.

Figure 5:
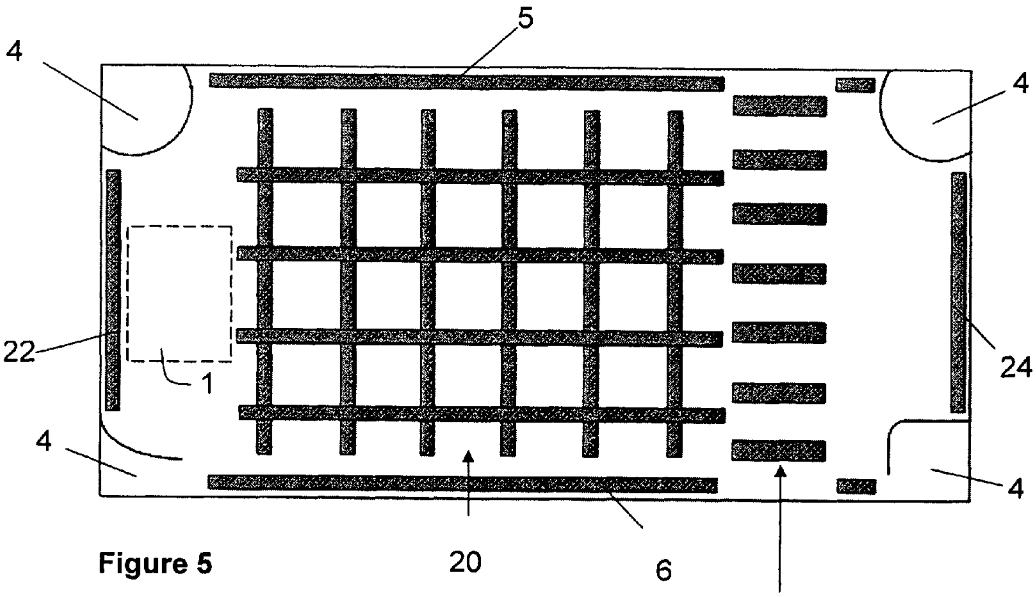
FIGS. 5-8 illustrate further examples of watermark patterns suitable for use in the method.

In FIG. 5 a regular grid structure 20 is shown. This would cover as much of the substrate-surface as possible without disturbing the aesthetics of the other elements of substrate-structure, such as the watermark. The grid-spacing would limit the size of the region that may be replaced in a composite, without being detected.

FIG. 5 also illustrates further linear watermark portions 22,24 extending along the short edges of the banknote substrate.

Figure 6:
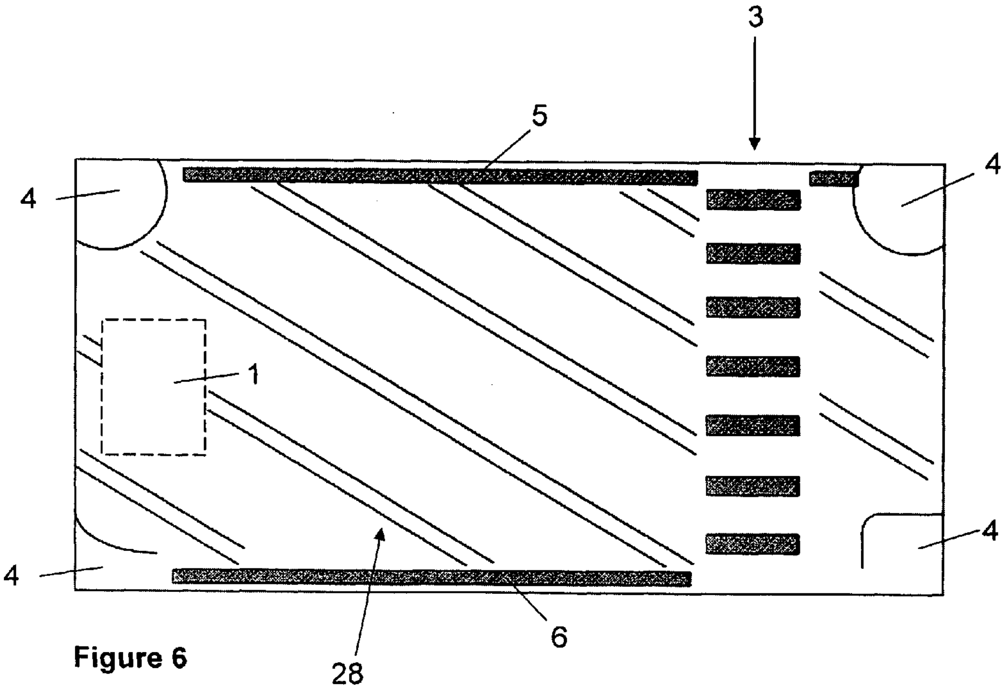

In FIG. 6, a set of parallel slanted structures 28 is shown. Such a slanted structure may be sparser than the grid structure of FIG. 5, and may still effectively provide the same degree of security. Again, the structure does not enter the watermark region 1.

Figure 7:
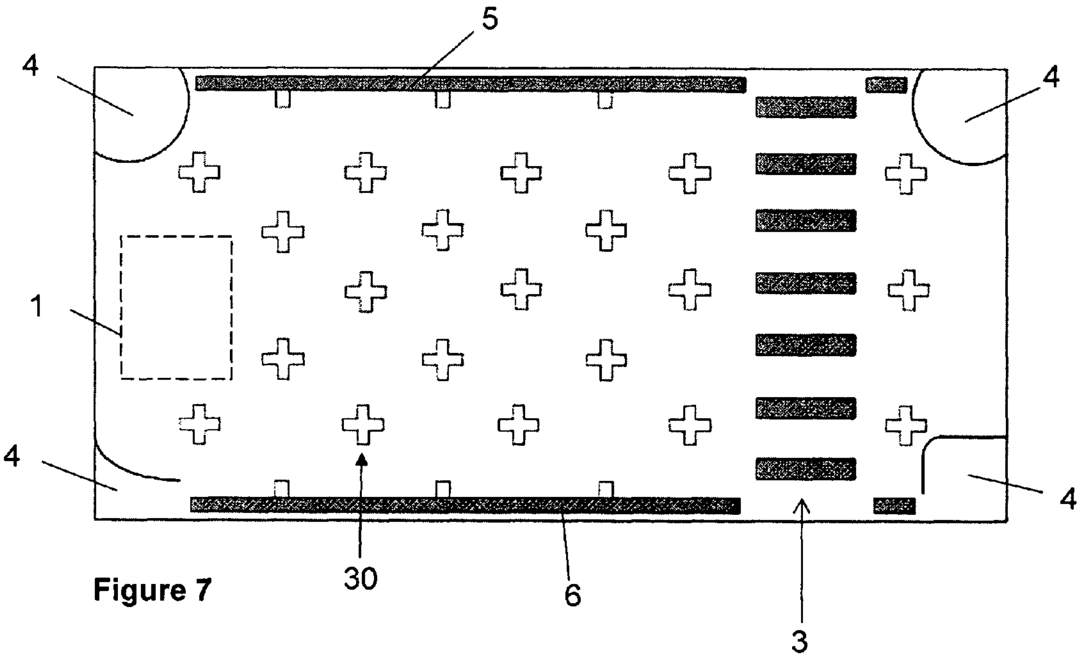

FIG. 7 shows a virtual grid 30 imposed by crosses positioned at regular intervals in both dimensions. This pattern has the advantage of covering a larger area than the grid pattern, while presenting a less-cluttered appearance. The crosses can be easily and robustly detected using a template-matching approach. The integrity of such a pattern may be verified not only along the directions parallel to the note-axes, but also along diagonals.

Figure 8:
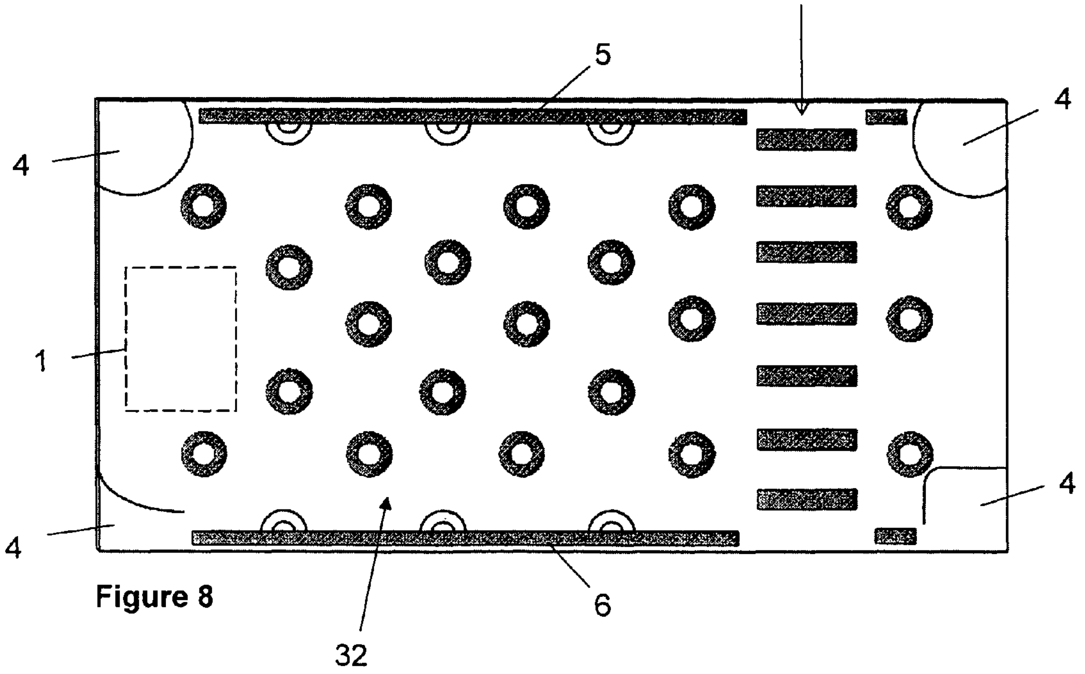

FIG. 8 shows a variation on the pattern proposed in FIG. 7, but with ring-structures 32, which can also be robustly detected using appropriate filters.

In the method described above, the watermark pattern alone is used to detect a composite banknote or substrate.

Figure 9:
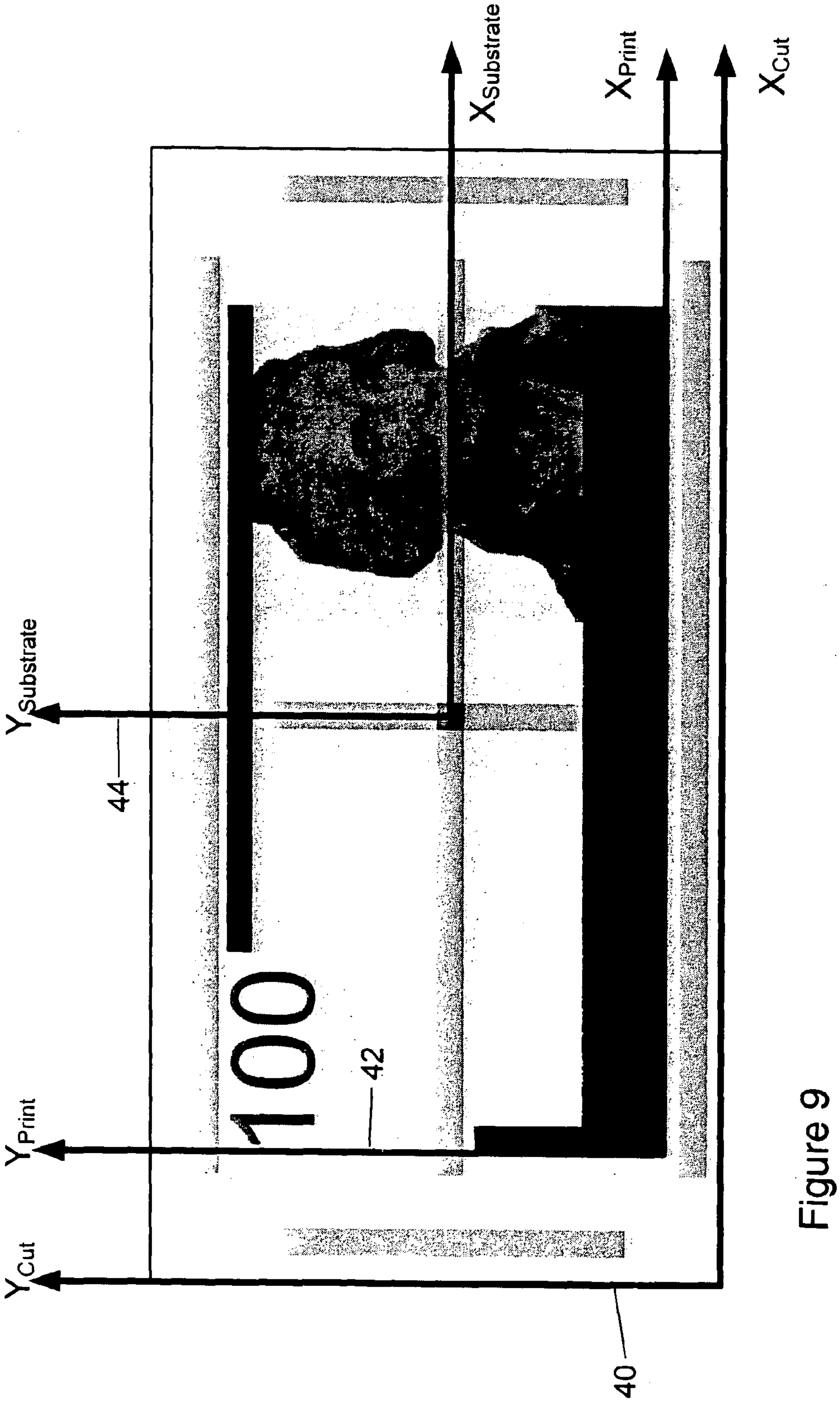
FIG. 9 illustrates schematically a genuine banknote and coordinate systems utilized with that banknote.

In an alternative approach, the method looks at the relative locations of the watermark pattern and print on the document. As shown in FIG. 9, various coordinate systems can be defined in relation to a banknote. These include a first coordinate system 40 defined by the outer edges of the banknote; a second coordinate system 42 defined by print, typically intaglio print, on the banknote; and a third coordinate system 44 defined by the watermark pattern. In a genuine banknote as shown in FIG. 9, the relative offset or register between each coordinate system will be the same throughout the note.

Figure 10:
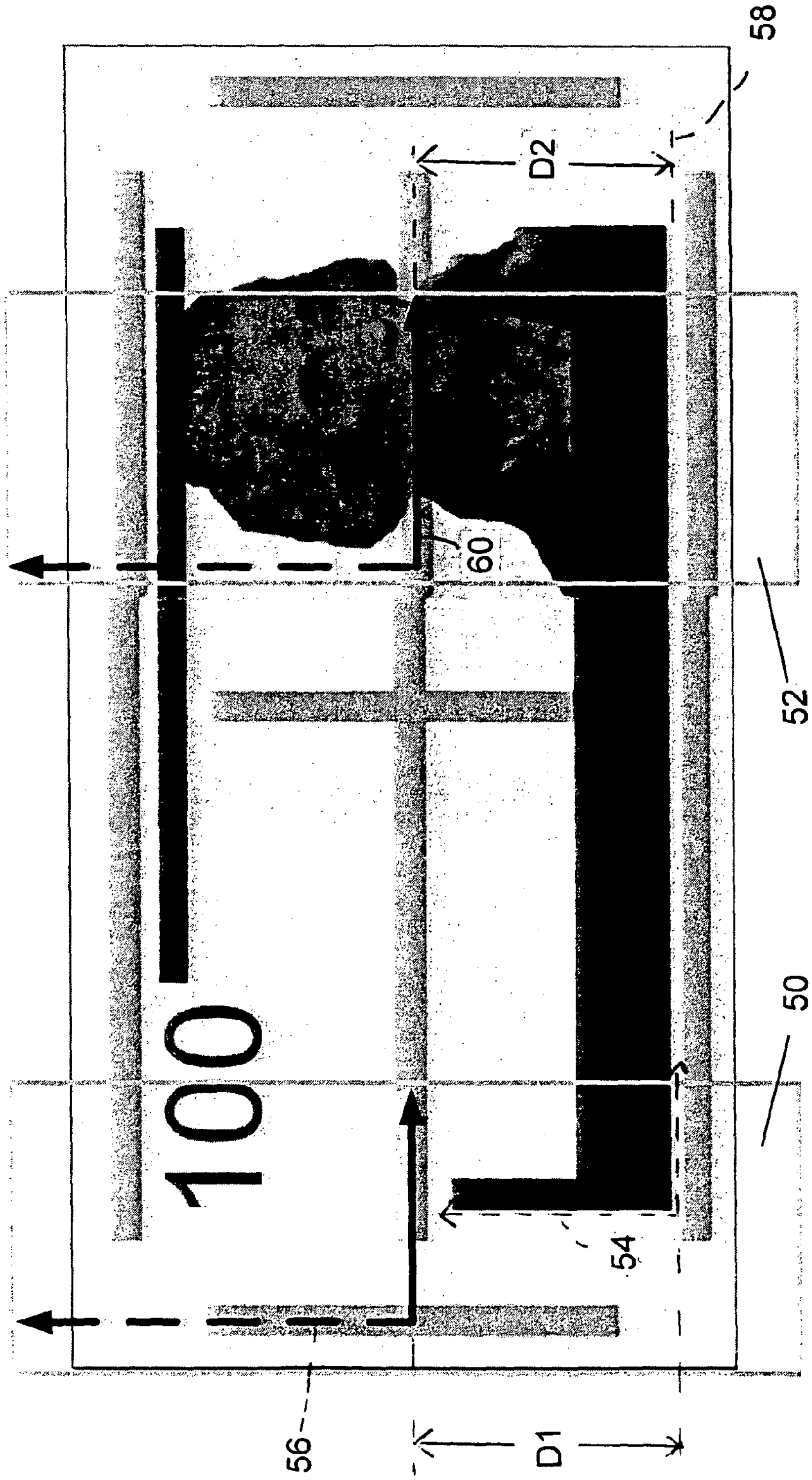
FIG. 10 is a view similar to FIG. 9 but of a counterfeit banknote.

In a counterfeit banknote as shown in FIG. 10, there will be a difference, particularly between the print and substrate coordinate systems.

In one method for detecting this, the banknote is inspected at two locations defined by respective analysis windows 50,52. In each window, the location of the coordinate systems 42,44 is determined. In the window 50 these are shown at 54 and 56 respectively. Once they have been determined, the vertical or Y direction distance between the origins of the two coordinate systems (shown as D1 in FIG. 10) is calculated.

The process is repeated in the window 52 to identify print and substrate coordinate systems 58,60 and to determine the vertical or Y distance between them D2.

As can be seen in FIG. 10, these distances D1,D2 are different indicating the presence of a counterfeit. The reason for this difference can be seen in FIG. 10 where there is a discontinuity in the underlying grid watermark pattern although when viewed optically, the banknote would appear genuine since the print appears continuous. As will be appreciated, the invention takes advantage of the fact that in conventional printing, the registration between the printed image and the underlying watermark pattern will differ from document to document. This is usually an undesired effect but in the present case is used to advantage.

The advantage of using analysis windows is that this provides a consistent location of the substrate and print coordinate systems across the banknote. Furthermore, it is preferable to use sub-pixel resolution techniques to provide accurate estimates with existing imaging sensors.

Figure 11:
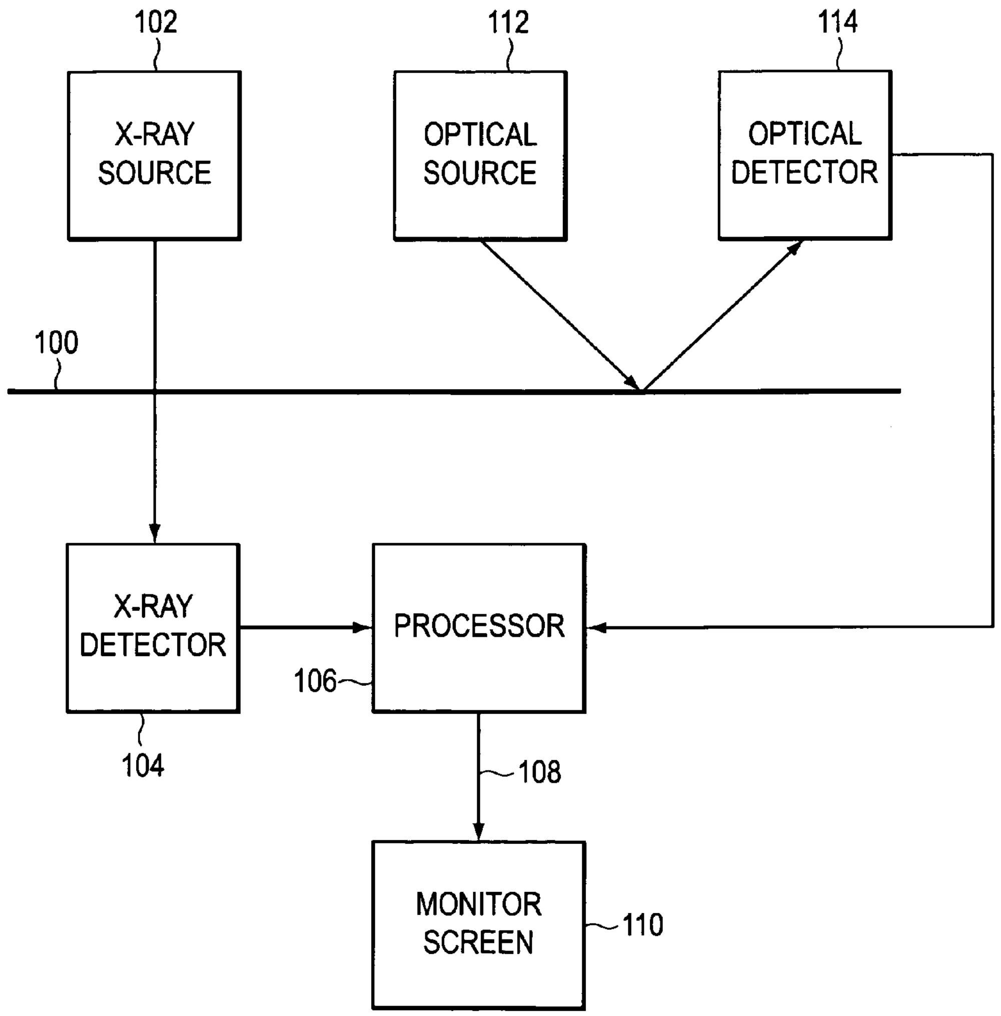
FIG. 11 is a schematic block diagram of a first example of apparatus for carrying out the method; and, FIG. 12 is a view similar to FIG. 11 but of a second example.

An example of apparatus for carrying out the methods is illustrated in FIG. 11. A banknote feed path is indicated at 100 and banknotes will be fed along this path in a conventional manner. An x-ray source 102 is provided above the path with an x-ray detector 104 in alignment beneath the path. The passage of x-rays through the banknote will be influenced by the watermark pattern and the resultant variation in the received signal is fed to a processor 106 which can build up a map similar to that shown in FIGS. 3 and 4 in either one or two dimensions. Other radiation such as infrared may be used for the source 102 and detector 104 with similar results.

If the method described above with reference to FIGS. 1-4 is used then the processor 106 carries out the necessary comparisons as described above and will generate an appropriate output signal on a line 108 indicating whether the banknote is judged to be genuine or note. This could be displayed on a suitable monitor screen 110 or used to control a downstream diverter to influence the passage of the banknote.

If the print to watermark pattern registration is to be determined then in addition, as shown in FIG. 11, a source of optical radiation 112 and an optical detector 114 are provided so as to detect light reflected by the banknote. The received signals are fed to the processor 106 which stores a digital image of the banknote and then carries out the method as described above with reference to FIGS. 9 and 10.

Figure 12:
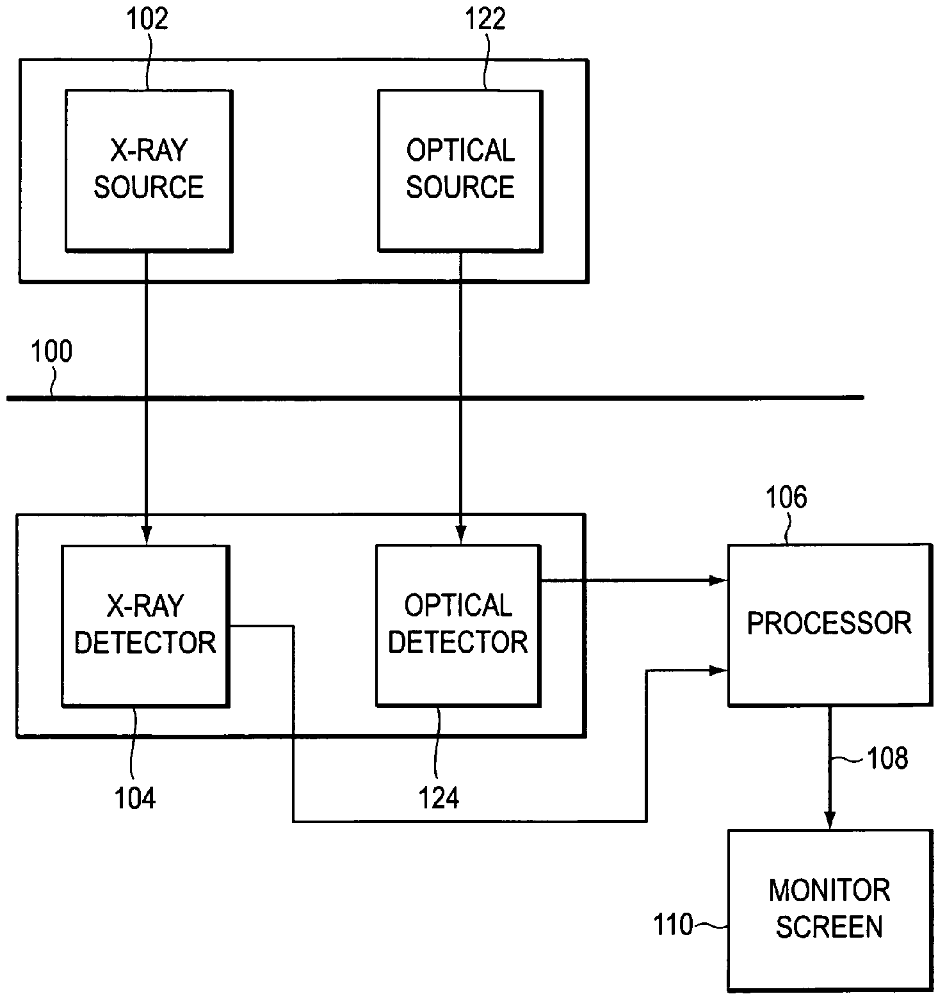

In an alternative implementation the print to watermark pattern registration is carried out using light transmitted through the banknote by adding, as shown in FIG. 12, a source of optical radiation 122 and an optical detector 124 in a transmissive arrangement. Furthermore in case of the use of infrared as the means to implement the source 102 and the detector 104, sources 102 and 122 as well as the detectors 104 and 124 may be combined in a single unit respectively using alternating (multiplexed) illumination.

The invention claimed is:

1. A method of determining the authenticity of a document of value, the document comprising a substrate provided with a watermark pattern, the watermark pattern being defined as a variation in the mass in the substrate, the method comprising determining with a processor whether the watermark pattern exhibits a discontinuity, and wherein the discontinuity is detected by comparing the watermark pattern with the watermark pattern of an authentic document of value.

2. A method according to claim 1, further comprising exposing at least part of the watermark pattern to radiation, such as x-ray or infrared radiation, and obtaining a corresponding image based on radiation transmitted through the document of value.

3. A method according to claim 1, wherein the watermark pattern extends over a major part of the document in one or two dimensions.

4. A method according to claim 3, wherein the watermark pattern extends over at least 50%.

5. A method according to claim 1, wherein the watermark pattern includes at least one straight or undulating line extending adjacent an edge of the document.

6. A method according to claim 5, wherein the watermark pattern includes straight and/or undulating lines extending along all edges of the document.

7. A method according to claim 1, wherein the watermark pattern comprises a regular two-dimensional grid.

8. A method according to claim 7, wherein the grid is formed by straight or undulating lines extending either parallel or diagonally with respect to sides of the document.

9. A method according to claim 7, wherein the watermark pattern comprises a regular array of geometric shapes.

10. A method according to claim 1, wherein the document of value comprises a banknote.

11. Apparatus for determining the authenticity of a document of value, the document comprising a substrate provided with a watermark pattern, the watermark pattern being defined as a variation in the mass in the substrate, the apparatus comprising: a device for detecting a watermark pattern formed in the substrate of the document; print detecting means for detecting print on a document, and a processor for determining whether the watermark pattern exhibits a discontinuity, and wherein the processor is adapted to compare the degree of registration between the print on a document of value and the watermark pattern at different location on the document.

12. A method according to claim 1, wherein the substrate is a paper substrate and the watermark pattern is defined as a variation in the mass of paper fibers in the substrate.

13. A method of determining the authenticity of a document of value, the document comprising a substrate provided with a watermark pattern, the watermark pattern being defined as a variation in the mass in the substrate, the method comprising determining with a processor whether the watermark pattern exhibits a discontinuity, and wherein the determining step comprises comparing the degree of registration between print on the document of value on the one hand and the watermark pattern on the other hand at different locations on the document.

14. A method according to claim 13, wherein the determining step is carried out at at least three locations on the document of value.

15. A method according to claim 13, wherein, at each location, a print registration and a watermark pattern registration are determined, the method further comprising determining the distance therebetween.

16. A method according to claim 13, wherein the print on the document of value is detected by obtaining an optical image of the surface of the document carrying the print by a reflective or transmissive measurement.

17. Apparatus according to claim 11, wherein the print detecting means is adapted to obtain an optical reflective image or an optical transmissive image of the document.

18. Apparatus according to claim 11, wherein the watermark pattern detecting device comprises means for exposing at least part of the watermark pattern to radiation, such as x-ray or infrared radiation, and for obtaining a corresponding image based on radiation transmitted through the document of value.

* * * * *